(12) United States Patent
Cox

(10) Patent No.: US 7,093,984 B2
(45) Date of Patent: Aug. 22, 2006

(54) ANCHOR FOR FIBER OPTIC CABLE

(75) Inventor: Larry R. Cox, Austin, TX (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 10/702,330

(22) Filed: Nov. 6, 2003

(65) Prior Publication Data

US 2005/0100286 A1 May 12, 2005

(51) Int. Cl.
*G02B 6/36* (2006.01)

(52) U.S. Cl. ........................................... 385/86

(58) Field of Classification Search .............. 385/86, 385/87, 88, 92, 100
See application file for complete search history.

(56) References Cited

U.S. PATENT DOCUMENTS

| | | | |
|---|---|---|---|
| 4,339,171 A | | 7/1982 | Makuch et al. |
| 4,447,120 A | | 5/1984 | Borsuk |
| 4,626,067 A | | 12/1986 | Watson |
| 4,795,229 A | * | 1/1989 | Abendschein et al. ........ 385/87 |
| 4,815,810 A | | 3/1989 | Betzler et al. |
| 4,948,222 A | * | 8/1990 | Corke et al. ................. 385/100 |
| 5,140,661 A | | 8/1992 | Kerek |
| 5,185,840 A | | 2/1993 | Iapicco |
| 5,199,095 A | | 3/1993 | Iapicco |
| 5,371,827 A | * | 12/1994 | Szegda ....................... 385/136 |
| 5,491,766 A | | 2/1996 | Huynh et al. |
| 5,514,055 A | | 5/1996 | Elliott |
| 5,559,917 A | * | 9/1996 | Ott .............................. 385/86 |
| 5,615,293 A | | 3/1997 | Sayegh |
| 5,745,633 A | * | 4/1998 | Giebel et al. ............... 385/136 |

(Continued)

FOREIGN PATENT DOCUMENTS

| | | |
|---|---|---|
| EP | 0 131 283 | 1/1985 |
| EP | 0 256 710 | 2/1988 |
| EP | 0 512 811 A1 | 11/1992 |
| EP | 0 563 995 A1 | 10/1993 |
| EP | 0 779 527 A2 | 6/1997 |
| EP | 1 245 980 A2 | 10/2002 |
| FR | 2 512 218 | 3/1983 |
| GB | 2 032 130 A | 4/1980 |
| GB | 2 110 834 A | 6/1983 |
| WO | WO 03/087913 A1 | 10/2003 |

OTHER PUBLICATIONS

Fiber Optic ST* and FC Connectors, Termination Procedures for Single –Mode and Multimode Field Mountable Connectors, Instructions, 3M Company, Austin TX, Apr. 1995, Issue 1, pp. 1–20.

(Continued)

*Primary Examiner*—Thanh-Tam Le
(74) *Attorney, Agent, or Firm*—Melanie G. Gover; Gregg H. Rosenblatt

(57) ABSTRACT

An anchored fiber optic cable and housing assembly. The assembly comprises: a fiber optic cable comprising a strength member and a jacket around the strength member, an anchor mounted on the cable, wherein the strength member includes a first end extending from the end of the cable and structurally engaged with the anchor; and a housing comprising an anchor cavity and a cable inlet, the anchor cavity comprising a shoulder for engaging with the anchor, wherein the anchor is mounted in the housing cavity and the cable extends through the cable inlet, and wherein the anchor cavity shoulder is engaged with the anchor to prevent the anchor from exiting the housing through the cable inlet. An anchored cable is also described, as are methods for mounting the anchor on the cable and mounting the cable in a housing. The cable may include a plurality of optical fibers in the jacket.

27 Claims, 3 Drawing Sheets

U.S. PATENT DOCUMENTS

| | | |
|---|---|---|
| 5,838,861 A | 11/1998 | Bunde |
| 5,892,871 A | 4/1999 | Dahan et al. |
| 5,895,079 A | 4/1999 | Carstensen et al. |
| 5,903,693 A | 5/1999 | Brown |
| 5,970,195 A | 10/1999 | Brown |
| 6,049,647 A | 4/2000 | Register et al. |
| 6,278,831 B1 | 8/2001 | Henderson et al. |
| 6,356,690 B1 | 3/2002 | McAlpine et al. |
| 6,389,214 B1 | 5/2002 | Smith et al. |
| 6,400,873 B1 | 6/2002 | Gimblet et al. |
| 6,419,399 B1 | 7/2002 | Loder et al. |
| 6,421,495 B1 | 7/2002 | Hoffmeister et al. |
| 6,438,299 B1 | 8/2002 | Brown et al. |
| 6,485,196 B1 * | 11/2002 | Shiino et al. ............. 385/87 |
| 6,496,625 B1 | 12/2002 | Falkowich et al. |
| 6,519,395 B1 | 2/2003 | Bevan et al. |
| 6,556,754 B1 | 4/2003 | Simmons et al. |
| 6,769,817 B1 * | 8/2004 | Saito et al. ............. 385/90 |
| 2002/0122653 A1 | 9/2002 | Donaldson et al. |
| 2003/0021575 A1 | 1/2003 | Werkheiser et al. |
| 2003/0063867 A1 | 4/2003 | McDonald et al. |
| 2003/0063868 A1 | 4/2003 | Fentress |
| 2003/0063869 A1 | 4/2003 | Elkins et al. |

OTHER PUBLICATIONS

3M Brand Biconic Connectors, Instruction Manual, Termination Procedures for Single–Mode and Multimode Field Mountable Connectors, 3M Fiber Optic Products, 1989.

U.S. Appl. No. 10/702,345, entitled "Anchor for Fiber Optic Cable", filed Nov. 6, 2003.

U.S. Appl. No. 10/702,826, entitled "Anchor for Fiber Optic Cable", filed Nov. 6, 2003.

* cited by examiner

ANCHOR FOR FIBER OPTIC CABLE

FIELD OF INVENTION

The present invention relates to an anchor for a fiber optic cable and a method of assembly. In particular, the present invention pertains to an anchor for a fiber optic cable that structurally engages a strength member in the cable and is conveniently mounted in a desired housing.

BACKGROUND

It is a common practice to attach fiber optic cables to various housings, connectors, or other optical devices. It is also known to structurally engage the strength member of the optical fiber to the fiber optic assemblies to provide a so-called "ruggedized" assembly. While methods and devices described in the art may be useful in various applications, there is a continuing need to develop other devices and methods that can easily be applied and mounted.

SUMMARY

Disclosed herein are an anchor for use with an optical cable, an anchored cable, and an anchored cable and housing assembly, along with methods of anchoring the cable and mounting the anchored cable in a housing. The anchor is structurally engaged with a strength member in the optical cable. The anchor may be conveniently mounted on the cable prior to mounting the cable in the housing.

In one aspect, the present invention relates to an anchored fiber optic cable and housing assembly. The assembly comprises: a fiber optic cable comprising a strength member and a jacket around the strength member, wherein the cable includes a first end and a second end; an anchor including a first end and a second end, wherein the cable is mounted in the anchor such that the first end of said anchor lies toward the first end of the cable, and wherein the strength member includes a first end extending from the first end of the cable and structurally engaged with the anchor; and a housing, the housing comprising an anchor cavity and a cable inlet, the anchor cavity comprising a shoulder for engaging with the anchor, wherein the anchor is mounted in the housing cavity and the cable extends through the cable inlet, and wherein the anchor cavity shoulder is engaged with the anchor to prevent the anchor from exiting the housing through the cable inlet. The assembly may include a plurality of optical fibers in the jacket.

In another aspect, the present invention relates to an anchored fiber optic cable assembly. The assembly comprises: a fiber optic cable comprising a strength member and a jacket around the strength member, wherein the cable includes a first end and a second end; an anchor including a first end and a second end, wherein the cable is mounted in the anchor such that the first end of said anchor lies toward the first end of the cable, and wherein the strength member includes a first end extending from the first end of the cable and structurally engaged with the anchor. The assembly may include a plurality of optical fibers in the jacket.

In yet another aspect, the present invention relates to a method of anchoring a fiber optic cable in a housing, wherein the cable comprises a strength member and a jacket around the strength member, and wherein the housing comprises an anchor cavity, a cable inlet, and an optical fiber outlet. The method comprises the steps of: placing an anchor over the cable jacket at the first end of the cable; structurally engaging the strength member with the anchor; thereafter mounting the anchor in the cavity of the housing such that the cable extends through the cable inlet of the housing, wherein the anchor and housing are configured such that the anchor cannot exit through the cable inlet. The assembly may include a plurality of optical fibers in the jacket.

As used herein, a "fiber optic cable" comprises at least one optically transmissive core, typically a glass core, each core surrounded by cladding. A buffer coating typically surrounds the core/cladding combination. A buffer tube typically surrounds the core/cladding, and can be either a tight or loose buffer tube as determined by its fit over the core. A protective jacket surrounds the buffer tube. A strength member is included within the jacket alongside the buffer tube. A fiber optic cable may contain more than one glass core and cladding. Information and data, packaged in the form of light waves, travels the length of the glass core. Thus, the glass core serves as the communication channel. The term "optical fiber" refers to the combination of the glass core, cladding, and buffer coating. The optical fibers may be arranged as a ribbon within the jacket. As explained in more detail below, it may be desirable to remove the optical fibers from the fiber optic cable while mounting the anchor and cable. For convenience, the term "fiber optic cable" will be used herein to refer to the jacket and strength member, with or without the optical fibers present in the fiber optic cable.

The above summary of the present invention is not intended to describe each disclosed embodiment or every implementation of the present invention. The Figures and the detailed description, which follow more particularly exemplify illustrative embodiments.

BRIEF DESCRIPTION OF THE DRAWINGS

The present invention can be described with reference to the following figures, wherein.

These figures are idealized, not drawn to scale and are intended for illustrative purposes.

DETAILED DESCRIPTION

Figure 1:
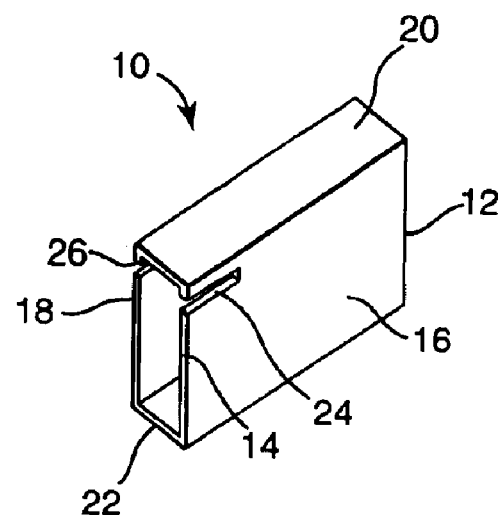
FIG. 1 is an isometric view of an exemplary anchor.

FIG. 1 shows an exemplary anchor for use with the present invention. The anchor 10 may be mounted on a fiber optic cable. The anchor 10 includes a first end 12 and a second end 14 opposite the first end. The anchor 10 also includes a first side wall 16 and a second side wall 18 opposite the first side wall. Anchor 10 also includes top wall 20 and bottom wall 22 opposite the top wall. The terms top, bottom, and side are used for convenience only, and do not require any particular orientation of the anchor. The walls are arranged so as to create a passageway within the walls, the passageway sized and configured to allow the anchor to be mounted over a desired configuration of fiber optic cable.

Figure 2:
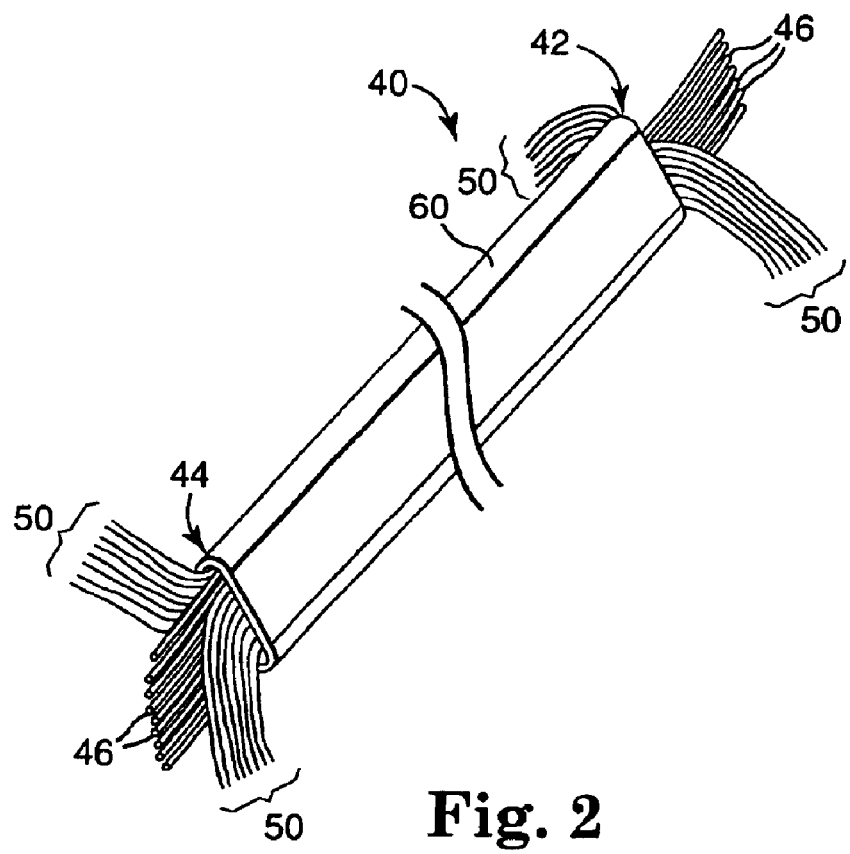
FIG. 2 is an isometric view of an exemplary fiber optic cable.

The anchor 10 also includes an engaging member to structurally engage with the strength member 50 of the fiber optic cable (as shown in FIG. 2). In the exemplary embodiment illustrated in FIG. 1, anchor 10 includes a first slot 24 in the first side wall 16. The slot is near the top wall 20, and is open to the second end 14 of the anchor. Anchor 10 also includes a second slot 26 in the second side wall. The second slot is near the top wall 20 and is open to the second end 14 of the anchor. Either or both slots may structurally engage the strength member 50 with the anchor 10.

FIG. 2 shows an exemplary fiber optic cable 40 for use with the present invention. Fiber optic cable 40 includes a first end 42 and a second end 44 opposite the first end. The fiber optic cable 40 also includes a plurality of optical fibers 46, and a strength member 50. The optical fibers and strength member are covered by a protective jacket 60. The optical fibers may be arranged in a ribbon arrangement, for example in a 1×12 arrangement or a 2×12 arrangement. Strength member 50 is selected to provide a high strength, low stretch component. In an exemplary embodiment, the strength member comprises a plurality of filaments. In one aspect the strength member comprises aramid fibers, such as Kevlar™ aramid fibers. The construction, manufacture and use of fiber optic cables is well known in the art, and need not be described in greater detail herein.

Figure 3:
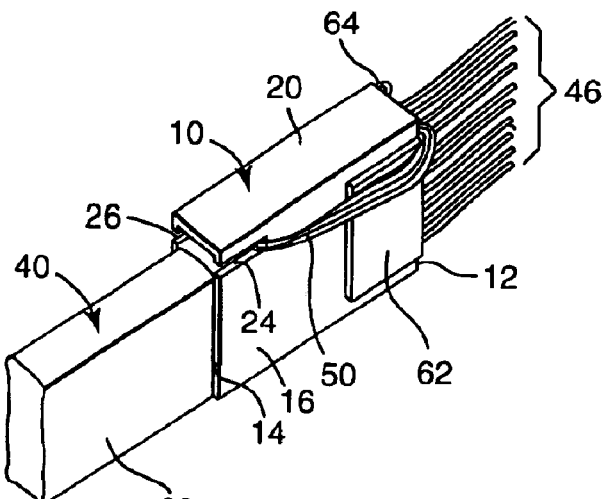
FIG. 3 is an isometric view of an exemplary anchor mounted on an exemplary fiber optic cable.

FIG. 3 shows an exemplary anchor 10 mounted on the first end 42 of an exemplary fiber optic cable 40. The fiber optic cable 40 extends through the passage of the anchor 10 that is formed by the walls of the anchor. The first end 12 of the anchor 10 faces toward the first end of the cable, while the second end 14 of the anchor faces toward the second end of the cable. The optical fibers 46 extend beyond the first end of the anchor. In the illustrated embodiment, first flap 62 and second flap 64 have been formed from the jacket 60 of the fiber optic cable at the first end 42 of the cable. The first flap 62 is bent backward along the outside of the first wall 16 of the anchor, extending from the first end 12 of the anchor toward the second end 14. Second flap 64 is bent backward along the outside of the second wall 18 of the anchor, extending from the first end 12 of the anchor toward the second end 14. While two such flaps 62, 64 are illustrated, the present invention may be carried out with a single flap, or without a flap.

A first end of the strength member extends from the first end of the cable. In the embodiment shown in FIG. 3, the strength member 50 has been divided into two portions. One portion of the strength member extends backward over the first side wall 16 of the anchor, and is structurally engaged in the first slot 24. A second portion of the strength member extends backward over the second side wall 18 of the anchor and is structurally engaged in second slot 26. These two portions of the strength member may be secured in the slots by any suitable means. For example, the two portions of the strength member may be secured to one another within the passage of the anchor, such as by knotting the two portions together. Another example is to knot the first portion of the strength member to prevent it from pulling back through the first slot, and knotting the second portion of the strength member to prevent it from pulling back through the second slot.

In another embodiment, the strength member 50 passes as a single portion back over any wall of the anchor 10 and is securely engaged within either slot 24 or 26, such as by tying a knot in the strength member.

In any of the just described embodiments, the strength member 50 may pass over either or both of the first and second flaps 62, 64 as the strength member extends from the first end of the anchor to either or both slots.

The passage formed by the walls of the anchor is sized and configured to allow the cable 40 to pass through. Therefore, the size and configuration will depend on the fiber optic cable chosen. In an exemplary embodiment, the passage is sized to be approximately the same width and height of the fiber optic cable. In another exemplary embodiment, the passage is sized to be up to 10% larger than the fiber optic cable. In another exemplary embodiment, the passage is sized to be up to 15% larger than the fiber optic cable. In another exemplary embodiment, the passage is sized to be at least 10% larger than the fiber optic cable.

An exemplary method of mounting the anchor 10 on the fiber optic cable 40 is as follows. The anchor may be mounted over the first end 42 of the cable 40, and pulled far enough back from the end of the cable to allow the first end of the cable to be prepared. The cable is prepared by trimming or otherwise positioning the jacket 60 to a length that leaves a desired length of strength member 50 and optical fibers 46 extending beyond the end of the jacket. Either or both of the flaps 62, 64 may be formed by making a cut in the jacket at the top of the cable from the first end 42 for a desired length, and by making a cut in the jacket at the bottom of the cable from the first end 42 for a similar length. The length of the flaps is not critical, and should be sufficient to allow the flaps to engage on the outside of the anchor 10. Typically, the flaps will be shorter than the length of the anchor 10. The flaps may also be trimmed to provide a height that is less than the height of the first and second side walls 16, 18, as measured in the direction between the top and bottom walls 20, 22. The anchor 10 is located near the first end 42 of the cable, at approximately the location where the flaps 62, 64 begin to extend from the intact portion of the jacket 60. The flaps are then bent back over the side walls 16, 18 of the anchor, from the first end 12 of the anchor toward the second end 14.

The strength member 50 may be structurally engaged with the engaging member of the anchor 10 as follows. In an exemplary embodiment in which the strength member 50 comprises a plurality of filaments, the filaments may be divided into two portions, with approximately half of the filaments in each portion. A first portion may extend from the first end 10 of the anchor over the first side wall 16 and be engaged with the first slot 14. The second portion may extend from the first end of the anchor over the second side wall 18 and be engaged with the second slot 16. The strength member 50 may be structurally engaged with the anchor 10 by engaging the two portions together within the anchor, such as by knotting the portions together. In another embodiment, each portion of the strength member may be knotted individually to prevent the respective portion from passing back through the respective slot. In another embodiment, the entire strength member is extended from the first end 10 of the anchor over any wall of the anchor and is structurally engaged with a slot, such as by knotting the strength member.

While the anchor 10 is being mounted on the cable 40, the optical fibers 46 may remain extending beyond the first end 12 of the anchor 10 as illustrated in FIG. 3. In another embodiment, the optical fibers 46 are pulled back from the first end 42 of the cable 40 while the flaps 62, 64 are formed and engaged and while the strength member 50 is engaged. The optical fibers 46 may then be put back into position extending beyond the first end 12 of the anchor 10. In another embodiment, the optical fibers may be completely removed from the cable 40, and reinserted after the cable and anchor are mounted to one another.

It is desirable to have a secure structural engagement between the anchor 10 and the strength member 50. This allows the strength member to carry tensile loads applied to the anchor while protecting the optical fibers 46 from being damaged by tension. In an exemplary embodiment, the optical fibers 46 may move transversely within the jacket and anchor without significantly adversely affecting the signal transmitting capability of the optical fiber. In the exemplary embodiment illustrated in FIG. 3, the structural engagement is accomplished by engaging the strength member 50 with either or both slots 24, 26 in the anchor 10.

In an exemplary embodiment, an adhesive may be applied when anchoring the fiber optic cable. The adhesive can help manage the filaments of the strength member 50, and can structurally engage the strength member with the anchor. For example, the adhesive may be applied to the strength member 50 in the area of the slots 24, 26. The adhesive may help secure the knot that engages the two portions of the strength member 50 within the anchor. Or, in those embodiments in which each portion of the strength member is individually knotted within its respective slot, the adhesive may be applied to each of these knots to help secure the knots. Adhesive may be applied to the flaps 62, 64, between the flap and the side walls 16, 18, to help structurally engage the jacket 60 with the anchor. The adhesive may be chosen depending on the material of the strength member, the jacket, and the anchor. Exemplary adhesives include cyanoacrylates, such as 3M™ Pronto™ Instant Adhesives CA8 and CA100 from 3M Company, St. Paul, Minn.; Loctite™ 380 and 480. Instant Adhesives, from Henkel Loctite Corporation, and epoxies.

Figure 4:
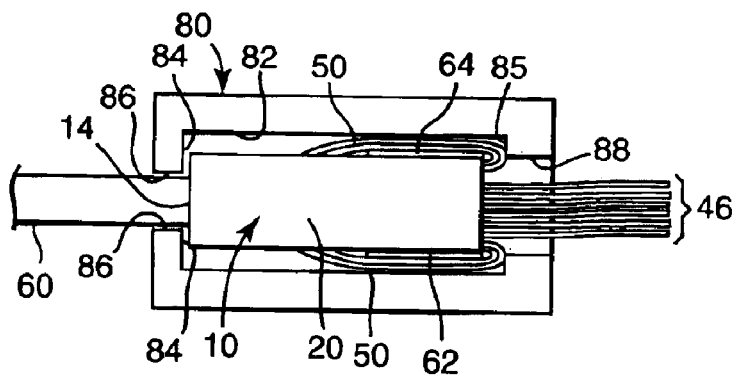
FIG. 4 is a top view of an exemplary anchored cable mounted in an exemplary housing.

An anchored cable according to the present invention is well suited for convenient mounting in a housing 80 as illustrated in FIG. 4. The housing may be a portion of any desired device useful with fiber optic cables. For example, the housing 80 may be a portion of a fan-out assembly, a shuffle, or an optical connector. An exemplary fan-out assembly is described in published PCT application WO03/087913. An exemplary fan-out assembly is commercially available as MTP™ MPO Multi-Fiber Fan-Out Cable Assembly, from 3M Company, Austin, Tex. An exemplary shuffle is described in U.S. Pat. No. 6,556,754. An exemplary optical connector is commercially available as an MTP™ Connector from US Connect, Hickory, N.C.

Exemplary housing 80 of FIG. 4 includes an anchor cavity 82. The anchor cavity 82 is sized and configured to engage with the anchor 10 of the present invention. The housing includes an inlet slot 86 that allows the fiber optic cable 40 to enter the housing 80 when the anchor is mounted in the anchor cavity. The housing also includes an outlet slot 88 that allows the optical fiber 46 to exit the anchor cavity 82 for connection as desired with an optical device. The anchor cavity includes a first shoulder 84 that is configured to engage with the anchor in such as way as to prevent the anchor from exiting the cavity 82 through the inlet slot 86. The anchor cavity also includes a second shoulder 85 configured to engage with the anchor in such a way as to prevent the anchor from exiting the cavity through the outlet slot 88. In an exemplary embodiment, the first shoulder 84 forms the inlet slot 86 to be smaller than the second end 14 of the anchor 10, and the second shoulder 85 forms the outlet slot 88 to be smaller than the first end 12 of the anchor 10. The housing 80 may have a plurality of anchor cavities 82 to accommodate a plurality of anchored cables.

Figure 5:
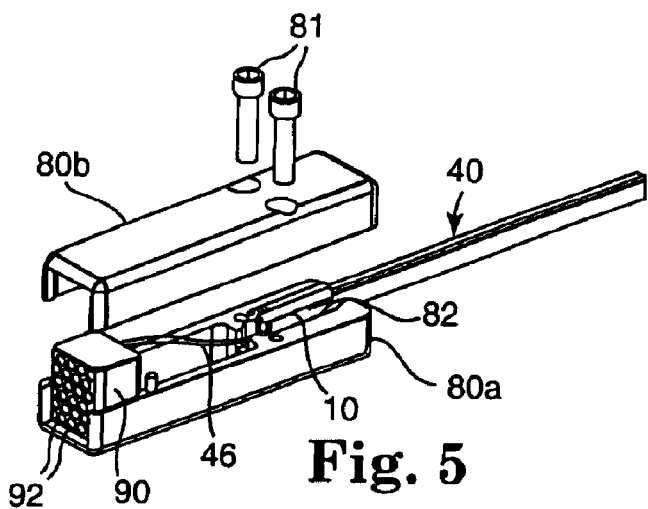
FIG. 5 is an isometric view of an exemplary anchored cable mounted in another exemplary housing.

In the exemplary embodiment illustrated in FIG. 5, the housing may be a two-piece housing such that the two pieces 80a, 80b may be secured together, such as with bolts 81, after the anchor 10 is placed within the anchor cavity 82. In the embodiment of FIG. 5, the housing is part of a shuffle. The shuffle includes shuffle end 90 with a plurality of outlets 92. Each outlet 92 is configured to receive one optical fiber 46 from the fiber optic cable 40.

When the anchored cable is mounted in the housing 80 as shown in FIG. 4 or 5, some of the advantages of the present invention are apparent. If tension is applied to the cable 40 or to the housing in a way that would tend to pull the cable through the inlet slot 86 of the housing, the anchor 10 will contact the first shoulder 84 to prevent the cable from exiting the housing. Because the strength member 50 is structurally engaged with the anchor 10, the strength member will carry the tension and help prevent the tension from adversely affecting the optical fibers 46. If a force is applied through the cable 40 that would tend to push the anchor 10 through the outlet slot 88, the second shoulder 85 will prevent the anchor from moving significantly in that direction. That will help prevent harmful bending of the optical fibers 46, and help avoid violating the minimum bend radius for the optical fibers.

Figure 6:
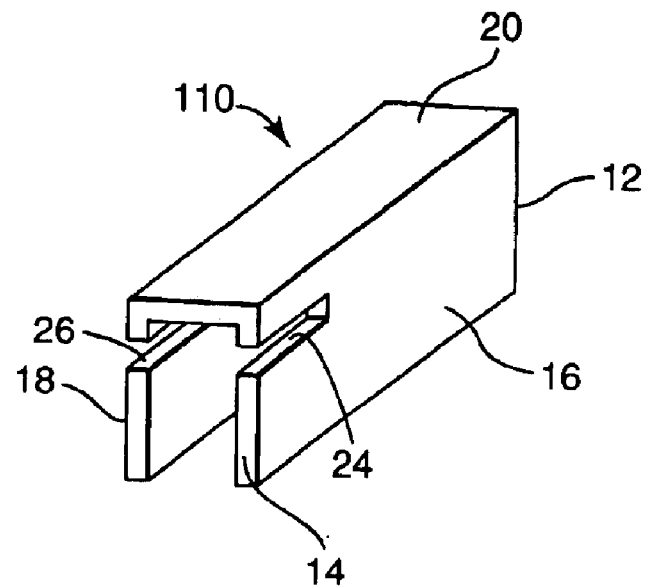
FIG. 6 is an isometric view of another exemplary anchor.

FIG. 6 illustrates an alternative embodiment of the anchor 110. This embodiment is similar in many respects to the embodiment 10 described above. Anchor 110 does not include a bottom wall. This allows the anchor 110 to be conveniently placed on the cable 40, by sliding it over the cable with the first and second side walls 16, 18 extending over the cable 40 until the top wall 20 comes to rest on the top of the cable. This is convenient for mounting and removing the anchor 10 without having unobstructed access to the end of the cable. For example, if the optical fibers 46 are connected to some optical device, or if the jacket 60 or strength member 50 are configured or arranged so as not to be able to conveniently pass through the passage formed by the enclosed walls of the anchor 10, anchor 110 of FIG. 6 may still be conveniently mounted on or removed from the cable 40.

Figure 7:
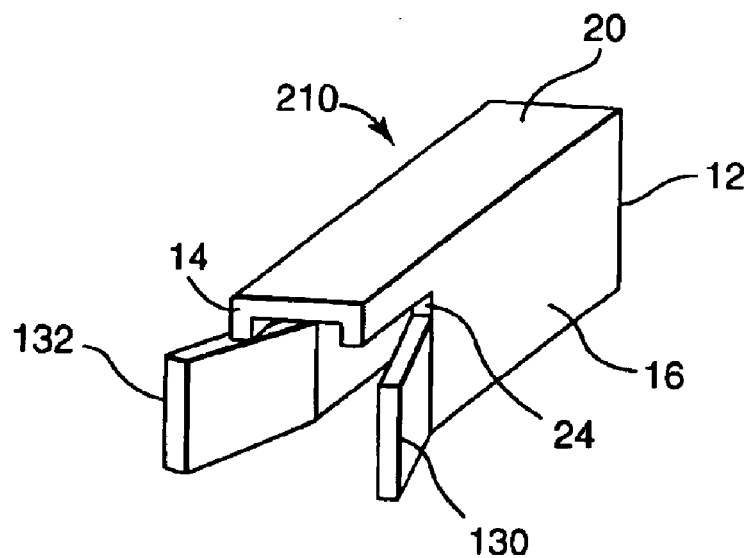
FIG. 7 is an isometric view of yet another exemplary anchor.

FIG. 7 illustrated yet another alternative embodiment of the anchor 210. This embodiment is similar in many respects the anchors 10 and 110 described above. In the exemplary embodiment illustrated in FIG. 7, the anchor 210 includes first and second barbs 130, 132 at the second end 14 of the anchor. The barbs begin at each respective side wall 16, 18, and taper outward in the direction of the second end 14. At the second end 14 of the anchor 210, the barbs 130, 132 are wider than the anchor is at its first end 12. The taper may begin anywhere along the length of the slots 24, 26. The material of the anchor 210 and the size and configuration of the barbs 130, 132, are selected so that the barbs are flexible and resilient. This would allow the anchor 210 to be inserted within a housing 80 by inserting the first end 12 of the anchor into housing 80 through the cable inlet slot 86. As the anchor 210 progresses from the first end 12 towards the second end, the inlet slot 86 will cause the barbs 130, 132 to flex inward toward the cable to allow the anchor to continue into the anchor cavity 82. When the second end 14 of the anchor 210 has passed the first shoulder 84 and is within the cavity 82, the barbs 130, 132 will spring back towards their original configuration. This wider configuration is larger than the inlet slot 86 in the housing and will prevent the anchor 210 from exiting the anchor cavity 82 through the inlet slot 86. This embodiment in convenient for housings that do not have access to the anchor cavity 82 such as through the two piece arrangements described above with respect to FIGS. 4, and 5. It is also useful with such two piece housings, but avoids the need to open the two pieces to mount the anchor 210 within the anchor cavity 82.

The anchor may be conveniently stamped or formed from any suitable metal or alloy, such as brass, stainless steel, copper, and aluminum. Other suitable materials include high strength molded plastic, such as Ultem™, Valox™, and Lexan™, all available from GE Plastics, and ABS.

The anchor of the present invention allows the fiber optic cable to have the anchor mounted thereon, and be structurally engaged with the strength member, prior to being installed in the housing. The anchor may be conveniently mounted on the cable without use of tools, and in particular without the need to crimp the outer sleeve onto the cable. The anchored cable may then be easily mounted in the housing 80, without having to crimp the anchor onto the housing. This allows the anchor to be mounted with the housing without having to provide room at the housing to apply a crimping tool. This also allows for a housing that may have a plurality of cables mounted therein, in close proximity to one another.

The second end of the cable may have mounted thereon an anchor according to the present invention. Such anchor may be mounted in a housing of an optical device as just described with respect to the first end of the cable. In such a case, the same advantages with regard to minimizing tension in the optical fibers and bending of the optical fibers may be attained as described with regard to the first end of the cable. The second end of the cable may have mounted thereon any desired optical connector, or may be connected with any desired optical device.

What is claimed is:

1. An anchored fiber optic cable and housing assembly, comprising:
    a fiber optic cable comprising a strength member, a jacket around said strength member, and a plurality of optical fibers in said jacket, wherein said fiber optic cable includes a fist end and a second end;
    an anchor including a first end and a second end, wherein said cable is mounted in said anchor such that said first end of said anchor lies toward said first end of said cable, wherein said strength member includes a first end extending from said first end of said cable and structurally engaged with said anchor, and said jacket includes a first flap extending from said first end of said anchor and wherein said flap extends over said anchor from said first end of said anchor in the direction towards said second end of said anchor; and
    a housing said housing comprising an anchor cavity and a cable inlet, said anchor cavity comprising a shoulder for engaging with said anchor, wherein said anchor is mounted in said housing cavity and said cable extends though said cable inlet, and wherein said anchor cavity shoulder is engaged with said anchor to prevent said anchor from exiting said housing through said cable inlet.

2. The anchored fiber optic cable and housing assembly of claim 1, wherein said plurality of local fibers comprises a ribbon arangement.

3. The anchored fiber optic cable and housing assembly of claim 1, wherein said strength member comprises a plurality of filaments.

4. The anchored fiber optic cable and housing assembly of claim 3, wherein said filaments comprise aramid filaments.

5. The anchored fiber optic cable and housing assembly of claim 1, wherein said anchor comprises a slot open to said second end of said anchor, and wherein said strength member is structurally engaged with said slot.

6. The anchored fiber optic cable and housing assembly of claim 1, wherein said jacket further includes a second flap extending from said fist end, and wherein said second flap extends over said anchor from said first end of said anchor in the direction towards said second end.

7. The anchored fiber optic cable and housing assembly of claim 1, wherein said strength member extends over at least a portion of said first flap, such that said first flap is between said outside of said anchor and said strength member.

8. The anchored fiber optic cable and housing assembly of claim 1, wherein said housing comprises a fiber optic fan-out assembly.

9. The anchored fiber optic cable and housing assembly of claim 1, wherein said housing comprises a fiber optic shuffle.

10. The anchored fiber optic cable and housing assembly of claim 1, wherein said housing comprises an optical connector.

11. The anchored fiber optic cable and housing assembly of claim 1, wherein said optical fibers may move transversely within said jacket without significantly adversely affecting the signal transmitting capability of said optical fibers.

12. The anchored fiber optic cable and housing assembly of claim 1, wherein said housing comprises an optical fiber outlet, and wherein said anchor cavity is configured to prevent said anchor from exiting through said optical fiber outlet.

13. An anchored fiber optic cable assembly, comprising:
    a fiber optic cable comprising a strength member, a jacket around said strength member, and a plurality of optical fibers in said jacket, wherein said cable includes a first end and a second end;
    an anchor including a first end and a second end, wherein said cable is mounted in said anchor such that said first end of said anchor lies toward said first end of said cable, wherein said strength member includes a first end extending from said first end of said cable and structurally engaged with said anchor, and said jacket includes a first flap extending from said first end of said anchor and wherein said flap extends over said anchor from said first end of said anchor in the direction towards said second end of said anchor.

14. The anchored fiber optic cable assembly of claim 13, wherein said plurality of optical fibers comprises a ribbon arrangement.

15. The anchored fiber optic cable assembly of claim 13, wherein said strength member comprises a plurality of filaments.

16. The anchored fiber optic cable assembly of claim 15, wherein said filaments comprise aramid filaments.

17. The anchored fiber optic cable assembly of claim 13, wherein said anchor comprises a slot open to said second end of said anchor, and wherein said strength member is structurally engaged with said slot.

18. The anchored fiber optic cable assembly of claim 13, wherein said jacket further includes a second flap extending from said first end, and wherein said second flap extends over said anchor from said first end of said anchor in the direction towards said second end.

19. The anchored fiber optic cable assembly of claim 13, wherein said housing comprises a fiber optic fan-out assembly.

20. The anchored fiber optic cable assembly of claim 13, wherein said housing comprises a fiber optic shuffle.

21. The anchored fiber optic cable assembly of claim 13, wherein said housing comprises an optical connector.

22. The anchored fiber optic cable assembly of claim 13, wherein said optical fibers may move transversely within said jacket without significantly adversely affecting signal sitting capability of said optical fibers.

23. A method of anchoring a fibs optic cable in a housing, wherein said cable comprises a strength member and a jacket around the strength member, and wherein said housing comprises an anchor cavity, a cable inlet, and an optical fiber outlet, said method comprising the steps of:

mounting an anchor on the cable jacket at the first end of the cable, wherein said jacket includes a first flap extending from a first end of said anchor and wherein said flap extends over said anchor from said first end of said anchor in direction towards a second end of said anchor;

structurally engaging the strength member with the anchor;

thereafter mounting the anchor in the cavity of the housing such that the cable extends through the cable inlet of the housing, wherein the anchor and housing are configured such that the anchor cannot exit through the cable inlet.

24. The method of claim 23, wherein said fiber optic cable further comprises a plurality of optical fibers in the jacket.

25. The method of claim 24, further comprising the step of forming a flap in the first end of the cable, and after the placing step, folding the flop along the outside of the anchor.

26. The method of claim 24, wherein the mounting step can be accomplished without the use of tools.

27. The method of claim 24, wherein the mount step can be accomplished without crimping.

* * * * *

UNITED STATES PATENT AND TRADEMARK OFFICE
CERTIFICATE OF CORRECTION

PATENT NO. : 7,093,984 B2 Page 1 of 2
APPLICATION NO. : 10/702330
DATED : August 22, 2006
INVENTOR(S) : Larry R. Cox It is certified that error appears in the above-identified patent and that said Letters Patent is hereby corrected as shown below:

Title Page,
Item [56], References Cited, under U.S. Patent Documents, please add the following references
        4,974,925    12/04/1990    Troutman et al.
        5,450,517    09/12/1995    Essert
        5,644,673    07/01/1997    Patterson Column 6,
Line 30, delete "10" and insert -- 110 -- therefor.

Column 7,
Line 35, delete "fist" and insert -- first -- therefor.
Line 46, after the first occurrence of "housing" insert -- , --.
Line 50, delete "though" and insert -- through -- therefor.
Line 55, delete "local" and insert -- optical -- therefor.
Line 56, delete "arangement" and insert -- arrangement -- therefor.

Column 8,
Line 1, delete "fist" and insert -- first -- therefor.

Column 9,
Line 1, after "affecting" insert -- the --.
Line 2, delete "sitting" and insert -- transmitting -- therefor.
Line 3, delete "fibs" and insert -- fiber -- therefor.
Line 12, after "in" insert -- the --.

UNITED STATES PATENT AND TRADEMARK OFFICE
CERTIFICATE OF CORRECTION

PATENT NO. : 7,093,984 B2
APPLICATION NO. : 10/702330
DATED : August 22, 2006
INVENTOR(S) : Larry R. Cox It is certified that error appears in the above-identified patent and that said Letters Patent is hereby corrected as shown below:

Column 10,
Line 10, delete "flop" and insert -- flap -- therefor.
Line 13, delete "mount" and insert -- mounting -- therefor.

Signed and Sealed this

Twenty-sixth Day of December, 2006

JON W. DUDAS
*Director of the United States Patent and Trademark Office*